(12) United States Patent
Vernersen et al.

(10) Patent No.: US 9,038,762 B2
(45) Date of Patent: May 26, 2015

(54) HYDRAULIC STEERING

(75) Inventors: Jan Vernersen, Haderslev (DK); Ove Pedersen, Aabenraa (DK); Niels Bjarne Hansen, Aabenraa (DK)

(73) Assignee: Sauer-Danfoss Aps, Nordborg (DK)

( * ) Notice: Subject to any disclaimer, the term of this patent is extended or adjusted under 35 U.S.C. 154(b) by 2391 days.

(21) Appl. No.: 11/714,364

(22) Filed: Mar. 6, 2007

(65) Prior Publication Data

US 2007/0221435 A1    Sep. 27, 2007

(30) Foreign Application Priority Data

Mar. 8, 2006    (DE) .......................... 10 2006 010 696

(51) Int. Cl.
*B62D 5/08*     (2006.01)
*B62D 5/093*    (2006.01)
*B62D 5/06*     (2006.01)

(52) U.S. Cl.
CPC ................ *B62D 5/093* (2013.01); *B62D 5/062* (2013.01)

(58) Field of Classification Search
CPC ........... B62D 5/06; B62D 5/062; B62D 5/093
USPC ......................................... 180/403, 441, 442
See application file for complete search history.

(56) References Cited

U.S. PATENT DOCUMENTS

| | | | |
|---|---|---|---|
| 3,394,545 A | 7/1968 | Thompson et al. | |
| 4,215,720 A * | 8/1980 | Becker | 137/596.2 |
| 4,311,006 A | 1/1982 | Becker | |
| 4,345,614 A * | 8/1982 | Karlberg et al. | 137/340 |
| 4,703,819 A * | 11/1987 | Hosotani | 180/403 |
| 4,736,811 A | 4/1988 | Marsden et al. | |
| 5,020,618 A * | 6/1991 | Nagao | 180/403 |
| 5,165,447 A * | 11/1992 | Arbjerg et al. | 137/625.22 |
| 5,234,070 A | 8/1993 | Noah et al. | |
| 5,263,321 A * | 11/1993 | Thomsen et al. | 60/384 |
| 5,520,262 A * | 5/1996 | Marcott | 180/418 |
| 6,408,977 B1 | 6/2002 | Obertrifter et al. | 180/442 |
| 6,490,861 B2 | 12/2002 | Biggi et al. | |
| 6,804,956 B2 | 10/2004 | Pedersen et al. | |
| 6,863,147 B2 | 3/2005 | Catellani | 180/417 |

(Continued)

FOREIGN PATENT DOCUMENTS

| DE | 102 57 130 A1 | 7/2004 |
|---|---|---|
| DE | 10 2004 021 531 | 9/2005 |

(Continued)

OTHER PUBLICATIONS

Article "Reatronic" from website http:/__/www.ognibene.com/eng/02/xidro__reatronic.htm dated Mar. 13, 2007; 2 pages.

(Continued)

*Primary Examiner* — Joseph Rocca
(74) *Attorney, Agent, or Firm* — McCormick, Paulding & Huber LLP

(57) ABSTRACT

The invention concerns a hydraulic steering (1) with a steering motor (8), a steering unit (2) with feedback behavior, a steering member activating the steering unit (2) and a shock valve arrangement (50) between the steering motor (8) and the steering unit (2). It is endeavored to enable changes of the feedback behavior in a simple manner. For this purpose it is ensured that a switchable feedback suppression device (9) is located at the side of the shock valve arrangement (50) facing away from the steering motor (8).

20 Claims, 7 Drawing Sheets

(56) References Cited

U.S. PATENT DOCUMENTS

| | | | |
|---|---|---|---|
| 6,971,472 B2 * | 12/2005 | Pedersen et al. | 180/403 |
| 2004/0182636 A1 * | 9/2004 | Pedersen et al. | 180/403 |
| 2004/0221714 A1 | 11/2004 | Bitter et al. | |
| 2006/0156914 A1 | 7/2006 | Dixen et al. | |

FOREIGN PATENT DOCUMENTS

| | | |
|---|---|---|
| DE | 10 2004 021 531 A1 | 9/2005 |
| EP | 0 244 418 B1 | 11/1988 |
| EP | 1 447 307 A2 | 1/2004 |
| GB | 1355955 A | 6/1974 |
| GB | 2 341 159 A | 3/2000 |
| WO | 86/05455 | 9/1986 |

OTHER PUBLICATIONS

Co-pending U.S. Appl. No. 11/714,510 entitled "Hydraulic Steering" filed Mar. 6, 2007.

Co-pending U.S. Appl. No. 11/714,419 entitled "Hydraulic Steering" filed Mar. 6, 2007.

Co-pending U.S. Appl. No. 11/714,424 entitled "Hydraulic Steering Arrangement" filed Mar. 6, 2007.

* cited by examiner

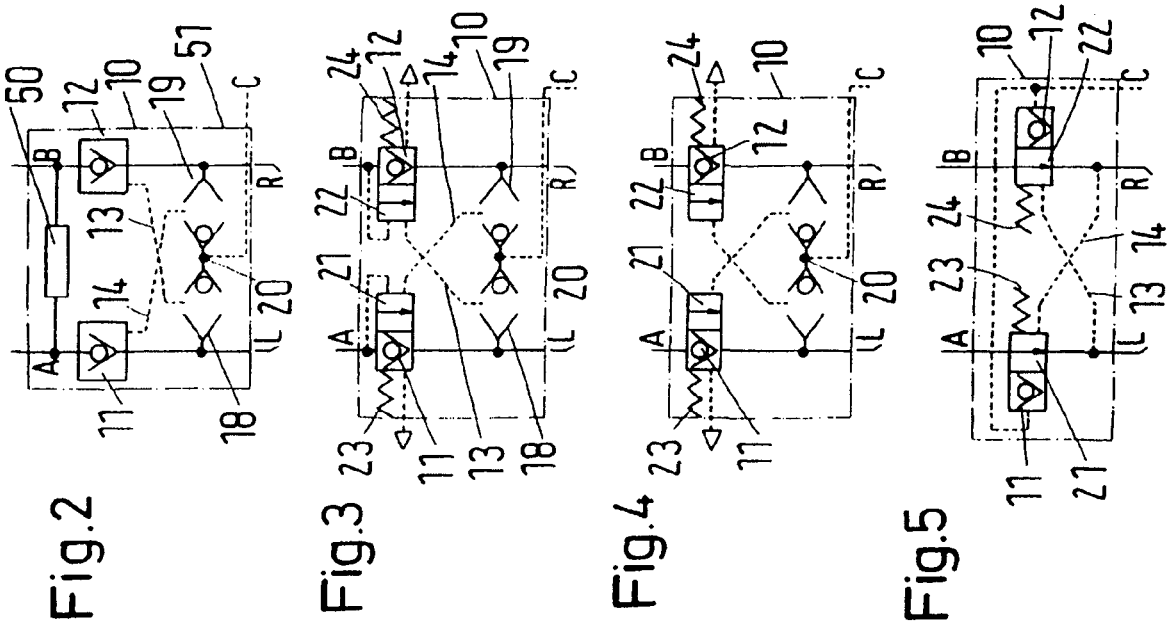
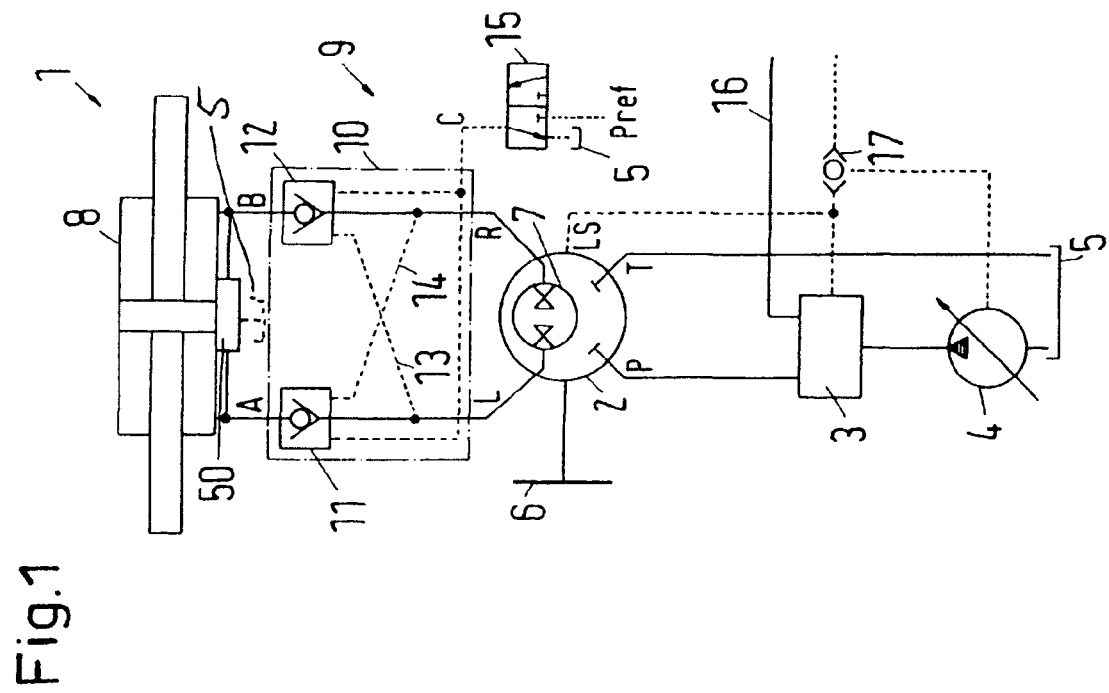

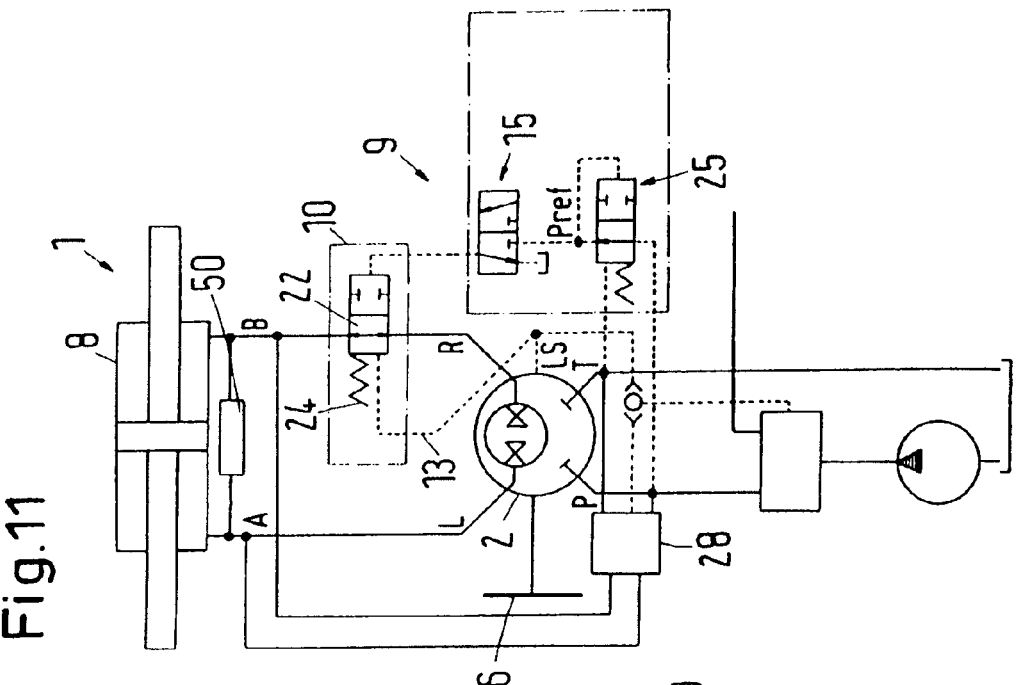
Fig.11
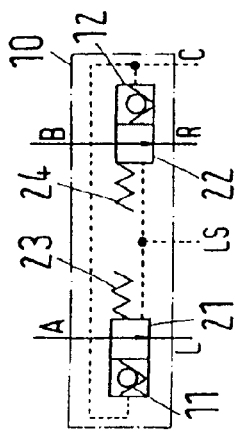
Fig.9
Fig.10
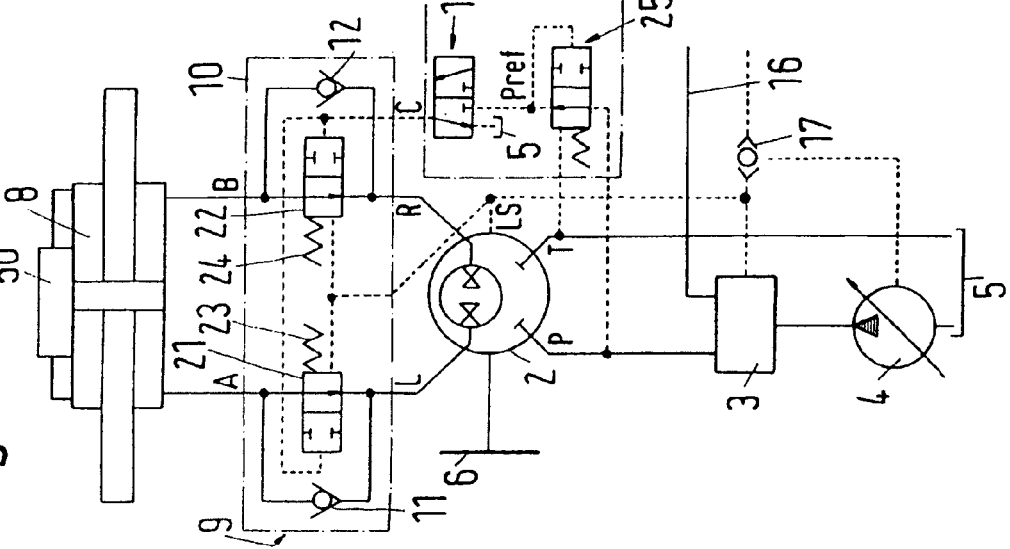
Fig.8

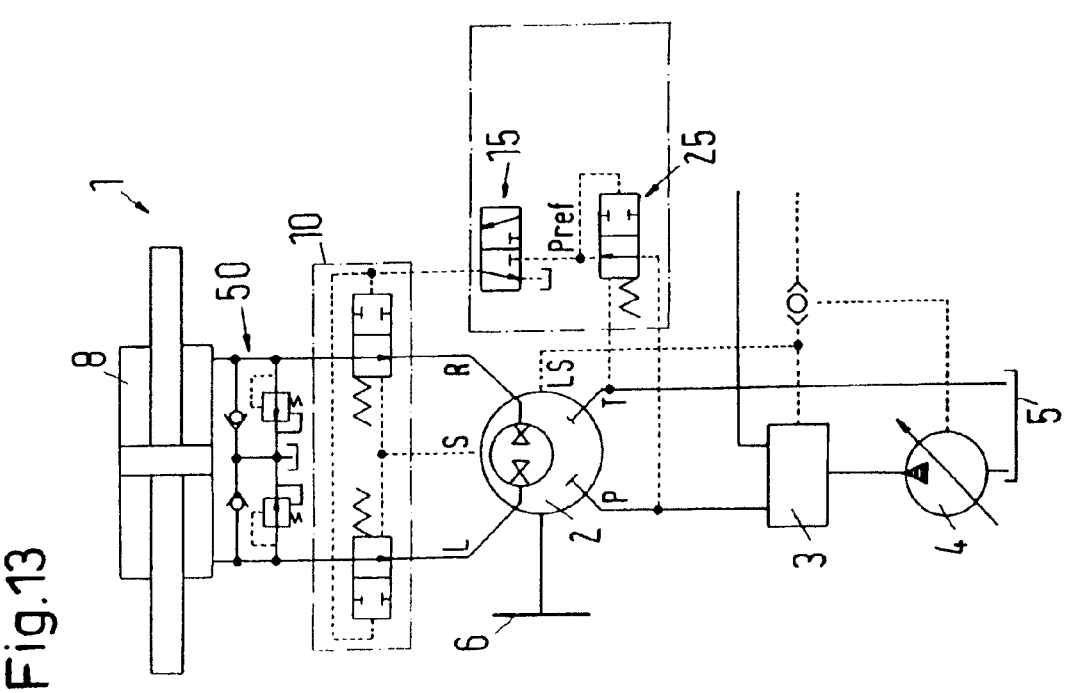
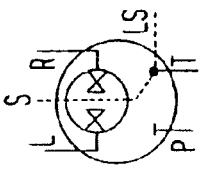 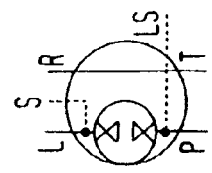 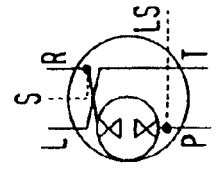
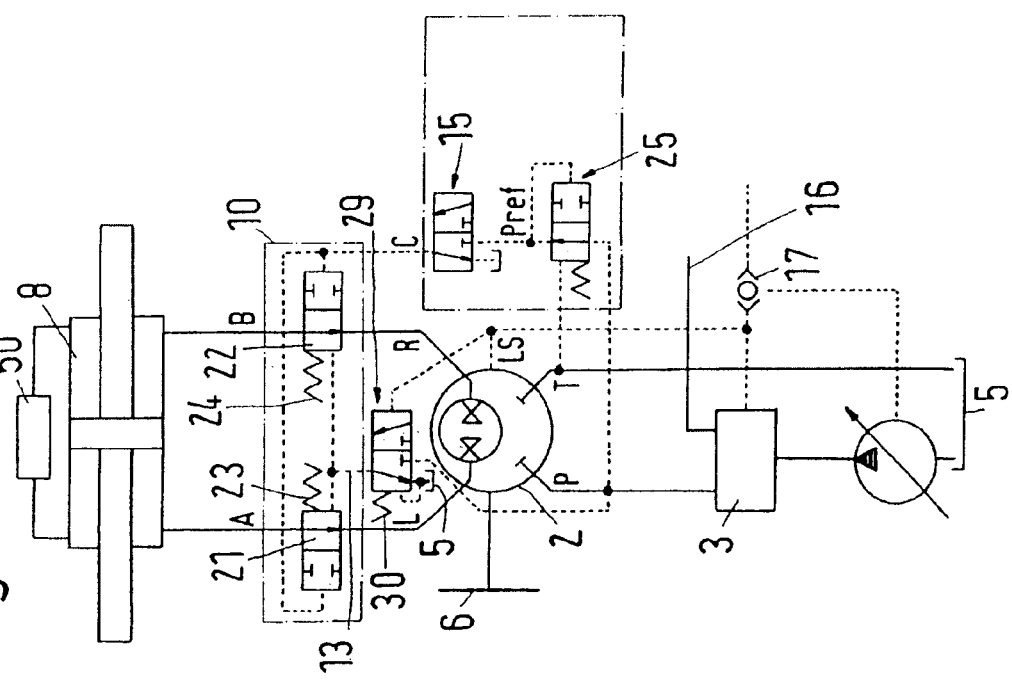

HYDRAULIC STEERING

CROSS REFERENCE TO RELATED APPLICATIONS

Applicant hereby claims foreign priority benefits under U.S.C. §119 from German Patent Application No. 10 2006 010 696.2 filed on Mar. 8, 2006, the contents of which are incorporated by reference herein.

FIELD OF THE INVENTION

The invention concerns a hydraulic steering with a steering motor, a steering unit with feedback behaviour, a steering member activating the steering unit and a shock valve arrangement between the steering motor and the steering unit.

BACKGROUND OF THE INVENTION

Such a steering is, for example, known from DE 10 2004 021 531 A1.

Such a hydraulic steering is preferably used with tractors or other self-propelled working machines, which are driving in different environments. A tractor, for example, must drive in public streets to get to a field. Its real work is then done, when driving in the field. When driving in the street, a steering behaviour is desired that corresponds to that of an ordinary vehicle. This means that the driver must be able to feel feedback of the steered wheels on the steering handwheel. For this purpose, it is required that the steering unit has feedback behaviour. Such a steering unit then also has the advantage that the vehicle automatically returns to straight forward driving, that is, the steered wheels can, in a manner of speaking, automatically return to the straight forward position, which the driver learns by means of the turning of the steering handwheel. When driving in the field, it is in many cases desired not to have such feedback behaviour. Otherwise, the driver would constantly have to act upon the steering handwheel or another steering member with a certain force.

SUMMARY OF THE INVENTION

The invention is based on the task of changing the feedback behaviour of a hydraulic steering in a simple manner.

With a hydraulic steering as mentioned in the introduction, this task is solved in that a switchable feedback suppression device is located at the side of the shock valve arrangement facing away from the steering motor.

Here, the term "shock valve arrangement" must be understood as a general term for a valve arrangement by means of which certain damaging situations for the steering motor can be prevented. Thus, the shock valve arrangement at least performs the function that in connection with forces acting upon the steering motor from the outside, a negative pressure in the steering motor can be avoided, as the shock valve arrangement permits a replenishing of hydraulic fluid. Usually, the shock valve arrangement also permits prevention of an excess pressure at the other connection of the steering motor. Such a shock valve arrangement is known per se. Often it is also called "shock/anti-cavitation valve arrangement".

When, now, the shock valve arrangement is no longer located direct at the steering unit, but, hydraulically seen, between the feedback suppression device and the steering motor or in parallel to the steering motor at a position on the side of the feedback suppression device facing away from the steering unit, the shock valve arrangement can also be active, when the feedback suppression device has changed the feedback behaviour so that the steering unit no longer feels feedback. Also in this situation the shock valve arrangement prevents the occurrence of cavitation and/or an excess pressure in the steering motor.

Preferably, the steering unit has a housing in which the feedback suppression device is located. Usually, the shock valve arrangement is also located in the housing of the steering unit. When the feedback suppression device is also located in the housing, an additional valve housing is no longer required. Further, the pipes between the active parts of the steering unit and the feedback suppression device can be made relatively stable, namely by means of bores or other channels inside the steering unit.

It is preferred that the shock valve arrangement is located in the housing. Thus, the traditional allocation of active parts of the steering unit and the shock valve arrangement can be maintained. Also, with only little effort the pipes between the active parts of the steering unit and the shock valve arrangement can be made very stable and thus pressure resistant.

Preferably, the steering unit has a measuring motor with a set of teeth forming several pressure chambers, each being connected to a valve arrangement via a pipe, the feedback suppression device having a stop valve in at least one pipe. When this one pipe is interrupted, hydraulic fluid cannot escape from the connected pressure chamber, when a pressure increase occurs in this pressure chamber because of the interaction of the elements of the set of teeth. When a pressure decrease occurs, on the other hand, hydraulic fluid cannot be replenished either, so that the set of teeth is blocked. In many cases, the set of teeth consists of an externally toothed gear wheel and an internally toothed gear ring, the gear ring having one more tooth than the gear wheel. A very common embodiment of such a set of teeth then forms six pressure chambers, which are connected via six pipes to the valve arrangement that is usually formed by rotary slides. When only one of the pipes has to be interrupted, a relatively small valve will be sufficient; whose activation only requires little force. This valve can have relatively small dimensions, so that major changes of the housing of the steering unit are not required.

It can also be ensured that the shock valve arrangement and the feedback suppression device are located in a common valve housing. This is particularly advantageous, when the feedback suppression device can no longer be located in the housing of the steering unit.

It is preferred that the valve housing is arranged at the steering motor. The valve housing can be flanged onto the steering motor or the valve housing can be integrated in the housing of the steering motor.

Preferably, the steering unit is connected to the steering motor via two working pipes, and the shock valve arrangement has an interrupt valve connecting the two working pipes and being biased in the closed position, the valve being acted upon in the opening direction by the higher of the pressures in the working pipes and connecting the two working pipes with each other in the open state. Here, the knowledge is utilised that an external force influencing the steering motor will cause a higher pressure in one working pipe, whereas an underpressure occurs in the other working pipe. Now, the higher pressure can be used in a simple manner for opening the interrupt valve, thus creating a pressure equalisation between the two working pipes. However, this pressure equalisation only occurs for as long as the required higher pressure is actually available for opening the interrupt valve. This pressure must be higher than the pressure usually provided by the steering unit. Such a shock valve arrangement can also be used without feedback suppression device, and also when a steering unit has no feedback behaviour, or together with a steering valve.

Preferably, the feedback suppression device acts upon both working pipes. This gives a "symmetrical" behaviour. The feedback suppression always occurs in the same way independently of the direction, in which the steering motor is acted upon by external forces.

Preferably, the feedback suppression device has a valve arrangement with electrical control inlet. The valve arrangement can thus be electrically activated, for example by means of a magnet.

Alternatively it may be ensured that the feedback suppression device has a valve arrangement with hydraulic control inlet. In this case, the valve arrangement of the feedback suppression device is exclusively hydraulically activated. An electrical system is no longer required to change the feedback behaviour of the steering unit. Hydraulic fluid under the required pressure is available in a hydraulic steering anyway, so that relatively few additional measures will be required to either activate or deactivate the feedback suppression device. When the feedback suppression device is deactivated or passive, the driver feels at the steering member the forces, which act upon the steering motor. When the feedback suppression device is activated or active, the driver does not feel the effects of such forces.

Preferably, the valve arrangement can also be opened by the pressure from the steering unit. With this embodiment it is ensured that the steering unit can always influence the steering motor, also when the feedback suppression device is active. Thus, the steering unit has a higher priority than the feedback suppression device, meaning that the feedback suppression device does not have to be turned off or deactivated to enable a steering.

Preferably, the control inlet is connected to an operation mode valve that supplies the control inlet with a higher or a lower control pressure in dependence of its activation. The operation mode valve can be a simple change-over valve that supplies a higher pressure to the control pressure inlet in one position. Depending on the design of the valve arrangement, this, for example, causes that the feedback suppression device is activated. When, however, the operation mode valve is switched so that the control inlet of the valve arrangement is supplied with a lower pressure, the feedback suppression device is deactivated. Of course, also a reversed switching is possible.

Preferably, the valve arrangement has a biasing device, which acts against the pressure at the control inlet. Thus, it is ensured that the valve arrangement and thus also the feedback suppression device always assume a defined state. Depending on the effect of the control pressure at the control inlet this causes that the biasing device either activates or deactivates the feedback suppression device.

Preferably, a series connection of two change-over valves is located between the two working pipes, the connecting point of the two change-over valves being connected to the control inlet, each change-over valve having an outlet that is connected to the valve in the working pipe not connected to the change-over valve. This is a relatively simple embodiment to ensure the use of the higher pressure in a working pipe to open the valve in the other working pipe, as long as the pressure in the working pipe is higher than the pressure at the control inlet. When this is not the case, the valves are acted upon by the pressure at the control inlet.

Preferably, a power assisted steering valve is arranged in parallel with the steering unit, the steering valve being connected to the working pipes in an area between the feedback suppression device and the steering motor. Then, the vehicle cannot only be controlled via the steering unit, but also via the steering valve. The steering valve can, for example, be a proportional valve. When the steering motor is controlled via the steering valve, the feedback suppression device is particularly advantageous, as it can prevent a movement of the steering member, which is caused by the activation of the steering motor via the steering valve.

Preferably, the operation mode valve is arranged in series with a pressure control valve. The pressure control valve ensures that the operation mode valve always passes on a predetermined pressure to the control inlet. This is a simple manner of ensuring that the control inlet is neither overloaded by receiving a too high pressure, nor undersupplied because the pressure is too low. When the pressure control valve is located between a high-pressure connection and the operation mode valve, it can also be ensured that also the operation mode valve only has to be dimensioned for a predetermined pressure.

Preferably, the steering unit has a load-sensing connection, whose pressure acts upon the valve arrangement against the pressure at the control inlet. By means of the pressure at the load-sensing connection, the effect of the pressure at the control inlet can be neutralized again. As soon as the driver activates the steering member, for example the steering handwheel, thus activating the steering unit, a higher pressure occurs at the load-sensing connection, which usually corresponds to the highest pressure available at the steering unit. In a simple manner this pressure is able to override the pressure at the control inlet, either directly or indirectly.

It is particularly preferred that the load-sensing connection is connected to an auxiliary valve that is located between a hydraulic servo line and a connection with higher pressure. The connection with higher pressure can be the supply connection or high-pressure connection of the steering unit. In this case, the activation of the valve arrangement will "consume" no large amount of hydraulic fluid. Such a consumption could cause a "hard point" in the steering. When the pressure at the load-sensing connection acts upon the auxiliary valve, only a small amount of hydraulic fluid is required to deflect the auxiliary valve or change its position. The small amount can practically not be felt by the driver or operator. Further, the auxiliary valve has the advantage that the pressure at the load-sensing connection in the neutral position does not have to be set exactly at the lowest pressure or tank pressure, when the auxiliary valve has a spring or another resetting device acting against the pressure at the load-sensing connection. The pressure at the load-sensing pressure will at least have to overcome the force of the resetting device, before the auxiliary valve is opened.

Preferably, the steering unit has a working pressure connection relieved in the neutral position of the steering unit to a low-pressure connection and, at a predetermined deflection of the steering unit, carrying the pressure ruling in the deflected working pipe, a pressure at the working pressure connection acting upon the valve arrangement against the pressure at the control inlet. The pressure at the working pressure connection is also called "S-pressure" or "S-signal". A steering unit with such a working pressure connection is available from Sauer-Danfoss ApS, Nordborg, Denmark, under the name of OSP-EL. This S-signal is characterised in that in the neutral position and in a small band around the neutral position it is relieved to the tank or another area with a low pressure. When deflecting to the left or to the right, the S-signal always receives the pressure, which rules at the outlet side of the set of teeth of the steering unit, that is, practically the pressure ruling in the "left" or "right" working pipe. Thus, a hard point in the steering is avoided, as no hydraulic fluid is consumed from the load-sensing connection. Further, there is a clearly defined "non-feedback state", as in the neutral position the S-signal is effectively set at the tank pressure. Further, the concept offers an advantage in the emergency steering situation, where the pressure built up on one of the two working pipes offers an additional safety for the forced opening of the valve unit.

In an alternative embodiment it is ensured that the steering unit is an "open-center" steering unit having a pressure connection that is connected to a counter-control connection, whose pressure acts upon the valve arrangement against the pressure at the control inlet. Thus, the behaviour of an "open-center" steering unit is utilised. In the neutral position this steering unit has a connection between the high-pressure connection and the low-pressure connection, so that in the neutral position of the steering unit basically the same pressure rules at the high-pressure connection and at the low-pressure connection. This pressure is not sufficient to open the valve arrangement. Not until the steering unit is activated, the connection between the high-pressure connection and the low-pressure connection is interrupted, so that the pressure required to switch the valve arrangement to a "feedback mode" is very quickly built up.

BRIEF DESCRIPTION OF THE DRAWINGS

In the following the invention is described on the basis of preferred embodiments in connection with the drawings, showing:

FIG. 1 is a first embodiment of a hydraulic steering with feedback suppression device, FIG. 2 is a modified embodiment of a feedback suppression device, FIG. 3 is a third embodiment of a feedback suppression device, FIG. 4 is a fourth embodiment of a feedback suppression device, FIG. 5 is a fifth embodiment of a feedback suppression device, FIG. 8 is a fourth embodiment of a steering, FIG. 9 is a modification of the feedback suppression device according to FIG. 8, FIG. 10 is a second modification of the feedback suppression device according to FIG. 8, FIG. 11 is a fifth embodiment of a steering, FIG. 12 is a sixth embodiment of a steering, FIG. 13 is a seventh embodiment of a steering, FIG. 14 is a schematic view explaining the S-signal.

DETAILED DESCRIPTION OF THE INVENTION

Figure 7:
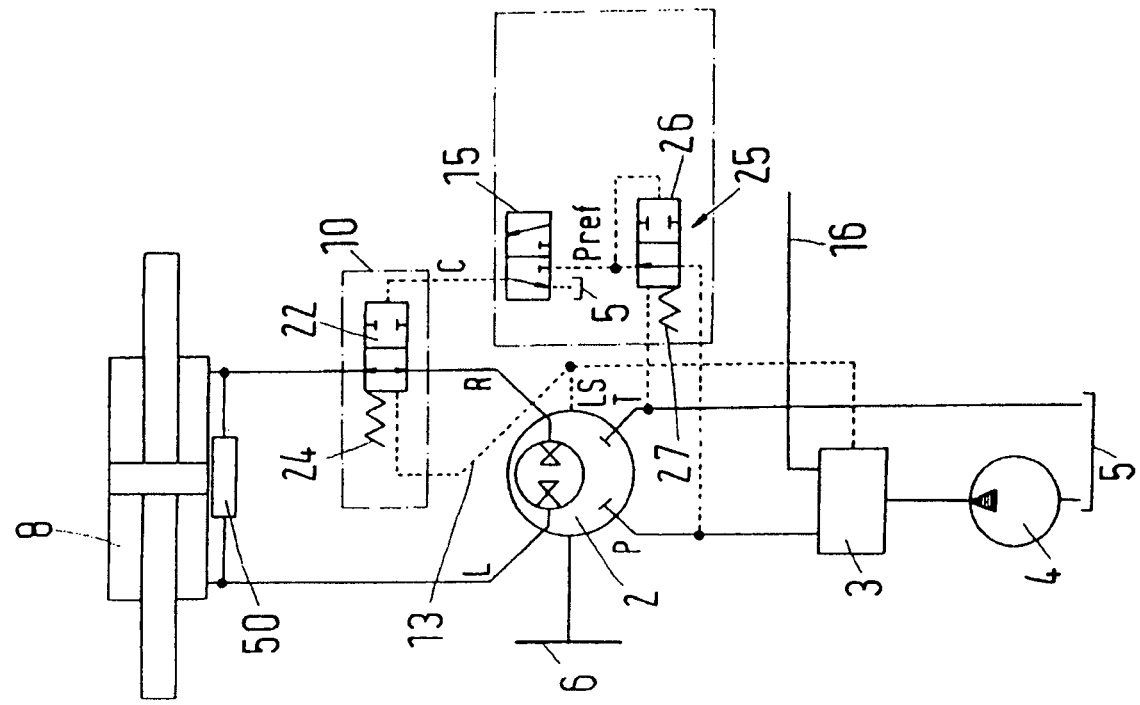
FIG. 7 is a third embodiment of a steering.

FIG. 1 shows a schematic view of a steering 1 with a steering unit 2, here in the form of a "closed-center" steering unit. In a closed-center steering unit a connection between a high-pressure connection P and a low-pressure connection T is interrupted in the neutral position.

Via a priority valve 3 the high-pressure connection P is connected to a pump 4, the pump 4 being shown as a displacement pump.

Further, the steering unit 2 comprises the low-pressure connection T, which is connected to a tank 5.

The steering unit 2 is activated by a steering member in the form of a steering handwheel 6. In a manner known per se, it has a set of teeth 7, which, for example, comprises an externally toothed gear wheel and an internally toothed gear ring and serves as measuring motor. By means of a directional valve, not shown in detail, pressurized hydraulic fluid can be supplied to one of two working pipes L, R. The working pipes L, R are connected to a steering motor 8, here shown in the form of a double-acting piston-cylinder unit.

Between the steering unit 2 and the steering motor 8 is located a feedback suppression device 9. The feedback suppression device 9 has a valve arrangement 10, which is, in the embodiment according to FIG. 1, provided with a non-return valve 11, 12 that can be opened in each working pipe L, R.

Via a hydraulic servo line 13 the working pipe L is connected to the non-return valve 12 in the other working pipe R. Via a hydraulic servo line 14 the working pipe R is connected to the non-return valve 11 in the other working pipe L. The pressure in the hydraulic servo lines 13, 14 opens the non-return valves 11, 12, so that a flow can pass them in a direction from the steering motor 8 to the steering unit 2.

Further, the two non-return valves 11, 12 are connected to a control inlet C, so that a pressure ruling at the control inlet C can open the two non-return valves 11, 12.

The control inlet C is connected to an operation mode valve 15, which connects the control inlet C to either the tank 5 or a reference pressure $P_{ref}$. In the shown position of the operation mode valve 15 the control inlet C is relieved to tank 5.

With such a steering 1, in which the feedback suppression device 9 comprises the valve arrangement 10 and the operation mode valve 15, it is possible to set either a non-feedback operation or a feedback operation.

In the shown position of the operation mode valve 15 the steering 1 works with no feedback. The two non-return valves 11, 12 are closed, so that no hydraulic fluid can flow from the steering motor 8 via the connections A, B into the valve arrangement 10. Accordingly, a feedback on the steering unit 2 does not occur.

When, however, the steering unit 2 is activated, for example to deflect the steering motor 8 to the left, the working pipe L of the steering unit 2 is exposed to pressure. The pressure in the working pipe L immediately opens the non-return valve 11 in the working pipe L, so that hydraulic fluid can flow to the left working chamber of the steering motor 8. The fluid displaced from the right working chamber of the steering motor 8 is then displaced to the connection B of the valve arrangement 10. From here it can flow off, as the non-return valve 12 in the working pipe R is opened via the hydraulic servo line 13.

As soon as the pressure in the steering unit 2 decreases, the two non-return valves 11, 12 close and the steering unit 2 is isolated from the steering motor 8.

When, however, the operation mode valve 15 is moved to the other position, the control inlet C is acted upon by a reference pressure $P_{ref}$, which opens the two non-return valves 11, 12. In this case, the hydraulic fluid displaced from the steering motor 8 is supplied directly to the steering unit where it causes a reaction that can usually also be felt at the steering handwheel 6.

The steering unit also comprises a load-sensing connection LS, which is connected on the one side to the priority valve 3 and on the other side to the pump 4. Via a branch line 16 the priority valve 3 is connected to a further hydraulic consumer, not shown in detail, which also reports its working pressure to the pump 4 via a two-way valve 17.

The steering 1 works exclusively with hydraulic signals when the operation mode valve 15 is hydraulically activated. During activation of the operation mode valve 15 the valve arrangement 10 of the feedback suppression device 9 is set so that a feedback of the steering motor on the steering unit 2 is either possible or not possible. However, the operation mode valve 15 can also be activated in a different manner, for example mechanically or electrically.

The steering 1 comprises a shock valve arrangement 50, only shown schematically in FIG. 1, which is arranged in parallel with the steering motor 8 between the two connections A, B, and thus between the two working pipes L, R. The shock valve arrangement 50 is located between the steering motor 8 and the feedback suppression device 9, so that the shock valve arrangement 50 can also fulfil its function to the full extent, when the feedback suppression device interrupts the feedback from the steering motor 8 on the steering unit 2. The shock valve arrangement 50 can, as shown with dotted lines, be connected to the tank 5.

Examples of embodiments of the shock valve arrangement 50 will be explained below in connection with the FIGS. 17 to 21.

The feedback suppression device 9 is located on the side of the shock valve arrangement facing away from the steering motor. This is to be understood so that no elements of the feedback suppression device are arranged between the steering motor 8 and the shock valve arrangement 50, which could hinder the function of the shock valve arrangement, that is, replenishing in connection with an underpressure or discharge of hydraulic fluid in connection with an excess pressure in the steering motor 8.

In the embodiment according to FIG. 1 the shock valve arrangement 50 is located in a housing, which is fixed on the steering motor 8, for example flanged onto the housing of the steering motor 8.

FIG. 2 shows a modified embodiment, in which same or similar elements have the same reference numbers as in FIG. 1.

Here, the shock valve arrangement 50 is placed in a housing 51 together with the valve arrangement 10 of the feedback suppression device. Such an embodiment is of course also possible in the embodiment according to FIG. 1.

Two two-way valves 18, 19 are connected in series between the working pipes L, R. A connecting point 20 between the two two-way valves 18, 19 is connected to the control inlet C. The two-way valve 18, which is connected to the working pipe L, has an outlet, which is connected via the hydraulic servo line 13 to the non-return valve 12 located in the other working pipe R. In a similar manner, the two-way valve 19, which is connected to the working pipe R, has an outlet, which is connected via the hydraulic servo line 14 to the non-return valve 11 in the first working pipe L.

The mode of functioning is similar to that in FIG. 1. When, for example, the working pipe L is exposed to pressure by the steering unit 2, the non-return valve 11 is immediately opened by the pressure in the working pipe. The non-return valve 12 in the other working pipe is opened, as the pressure in the working pipe L is led via the two-way valve 18 and the hydraulic servo line 13 to the non-return valve 12 so that the non-return valve 12 opens. In this case the control inlet C is at a low pressure, that is, the operation mode valve 15 is in the position shown in FIG. 1.

When, however, the control inlet C is brought to a higher pressure by means of the operation mode valve 15, the two two-way valves 18, 19 change over and immediately pass on the pressure from the control inlet C to open the two non-return valves 11, 12.

FIG. 3 shows an embodiment, in which the non-return valves 11, 12 have been integrated in slides 21, 22 of slide valves. The slides 21, 22 are pressed to the position shown by springs 23, 24, as long as the pressure at the control inlet C is lower than a pressure corresponding to the force of the springs 23, 24. In this case, the valve arrangement 10 according to FIG. 3 works exactly like the valve arrangement according to FIG. 2. In the closed state the non-return valves 11, 12 prevent hydraulic fluid from the steering motor 8 from getting to the steering unit 2. An activation of the steering motor 8 by the steering unit 2, however, is possible.

When the operation mode valve 15 is switched from the position shown in FIG. 1, the two slides 21, 22 are displaced against the force of the springs 23, 24 to the position not shown, so that a passage through the working pipes L, R from the steering motor 8 to the steering unit 2 is possible. The pressures at the connections A, B of the valve arrangement 10 act in the same direction as the pressure of the control inlet C to open the valves in the working pipes L, R.

The embodiment of the valve arrangement 10 in FIG. 4 corresponds to that in FIG. 3. Merely the connection between the connections A, B and the slides 21, 22 is missing.

In the embodiment of the valve arrangement according to FIG. 5 the springs 23, 24 load the slides 21, 22 so that the two working pipes L, R are passable, hen the operation mode valve is in the position shown in FIG. 1 and the control inlet C is pressure relieved accordingly.

In the embodiments according to FIGS. 1 to 4 a non-feedback operation is set, when no pressure or only a low pressure is available at the control inlet C.

In the embodiment according to FIG. 5, however, a feedback operation is set, when no pressure or only a low pressure is available at the control inlet C.

When a high pressure is available at the control inlet C, that is, a pressure exceeding the force of the springs 23, 24, the slides 21, 22 are displaced so that the non-return valves 11, 12 are in the working pipes L, R. In this case a feedback of the steering motor 8 on the steering unit 2 is no longer possible.

A steering by means of the steering unit 2, however, is possible. When, for example, the working pipe L is exposed to pressure, the non-return valve 11 opens and the pressure ruling in the hydraulic servo line 13 displaces the slide 22 to the position shown in FIG. 5, so that hydraulic fluid can flow off from the steering motor 8.

Figure 6:
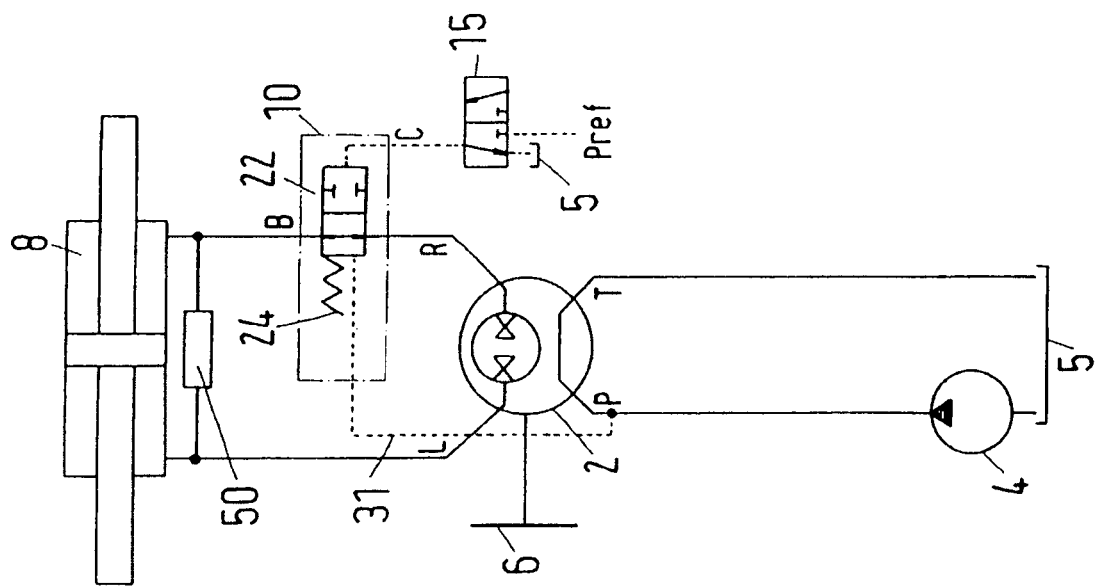
FIG. 6 is a second embodiment of a steering.

Whereas in the embodiments according to FIGS. 1 to 5 the valve arrangement 10 is made to have a valve for each working pipe L, R, this is not the case in the embodiment according to FIG. 6. Here, the valve arrangement 10 has only one single valve with a valve slide 22, which is pressed into the opening position by the spring 24, when the pressure at the control inlet C is relieved to the tank 5. When, however, the operation mode valve 15 is changed over, the control inlet is supplied with the reference pressure $P_{ref}$, so that the slide 22 is brought to the closing position and interrupts the working pipe R.

In the embodiment according to FIG. 6 the steering unit 2 is made as an "open-center" steering unit, that is, in the neutral position the steering unit 2 has a connection between the pressure connection P and the tank connection T. Via a counter-control connection 31 the pressure connection P is connected to the slide 22, so that the pressure in the counter-control connection 31 acts in the same direction as the force of the spring 24.

The force of the spring 24 corresponds to, for example, a pressure of 7 bar. Also the springs 23, 24 in the embodiments according to FIGS. 3 to 5 can correspond to a pressure of 7 bar. The reference pressure $P_{ref}$ is, for example, 13 bar, so that the slide 22 is displaced to the closing position, when the operation mode valve 15 is not switched to the position shown. In this case a feedback of the steering motor 8 on the steering unit 2 is not possible.

When, however, the steering unit 2 is activated, the connection between the pressure connection P and the tank connection T is interrupted, so that the pressure at the pressure connection P very quickly rises to the outlet pressure of the pump 4. At least together with the force of the spring 24 this outlet pressure exceeds the pressure $P_{ref}$, so that for steering the slide 22 can be displaced to the opening position.

In the embodiment according to FIG. 7 a "closed-center" steering unit 2 is used again, with which a connection between the pressure connection P and the tank connection T does not either exist in the neutral position.

The steering unit 2 according to FIG. 7 has a load-sensing connection LS, which acts upon the slide 22 of the valve arrangement 10 via the hydraulic servo line 13 in the same direction as the spring 24.

In the shown switching position of the slide 22 the working pipe R is open for passage. Due to the position of the operation mode valve 15 the pressure at the tank 5 rules at the control inlet C. In this case a steering with feedback behaviour occurs.

When the operation mode valve 15 is changed over, the reference pressure $P_{ref}$ reaches the control inlet C and changes over the slide 22, so that the working pipe R is interrupted. In this case a feedback of the steering motor 8 on the steering unit 2 is not possible. When, however, the steering unit 2 is activated, the pressure at the load-sensing connection LS increases, opening together with the spring 24 the working pipe R in that the slide 22 is displaced to the position shown.

In FIG. 7 the reference pressure $P_{ref}$ is set by means of a pressure control valve 25, for example at a value of 13 bar. The pressure control valve 25 has a valve slide 26 loaded in the opening direction by the force of a spring 27 and the pressure at the tank connection T. In the closing direction the valve slide 26 is loaded by the pressure at the outlet of the pressure control valve 25. The inlet of the pressure control valve is connected to the pressure connection P.

The value of the reference pressure $P_{ref}$ can be set by selecting the force of the spring 27.

The embodiment according to FIG. 8 shows that the pump 4 is a regulating pump controlled by the pressure at the load-sensing connection LS. Of course also here an embodiment with a pump 4 with fixed displacement is possible, that is, an embodiment as in FIG. 7.

The valve arrangement 10 has a non-return valve 11, 12 in each working pipe. Further, in each working pipe the valve arrangement 10 has a valve slide 21, 22, which is pressed into the opening position (shown) by the force of the springs 23, 24. In this case a feedback steering is possible, as a permanent, direct connection exists between the steering motor 8 and the steering unit 2.

Only when the mode operation valve 15 is changed over so that the reference pressure $P_{ref}$ reaches the control inlet C, the slides 21, 22 are displaced against the force of the springs 23, 24, so that the working pipes L, R are interrupted. In this case there is no feedback from the steering motor 8 on the steering unit 2.

However, the steering unit 2 can still activate steering motor 8. In the "forward direction" the non-return valve 11, 12 located in the respective working pipe is opened. In the "return direction" the slide 22 is opened by the pressure at the load-sensing connection LS. The shock valve arrangement 50 is here located at the "other" side of the steering motor 8 than the valve arrangement 10 of the feedback suppression device. However, it appears clearly that the shock valve arrangement 50 and the steering motor 8 are located together on the side of the feedback suppression arrangement 9 facing away from the steering unit 2. In the frames of this description also such a location must be understood so that the feedback suppression device is located at the side of the shock valve arrangement 50 facing away from the steering motor 8.

The FIGS. 9 and 10 show modified embodiments of the valve arrangements.

In the embodiment according to FIG. 9 the non-return valves 11, 12 are integrated in the slides 21, 22.

In the embodiment according to claim 10 there are no non-return valves. The feedback suppression occurs exclusively by means of the slides 21, 22, which are, when the control inlet C is without pressure, opened against the force of the springs 23, 24 to enable feedback behaviour. When however, by means of the operation mode valve 15, the slides 21, 22 are exposed to pressure, the slides move into the closed position against the force of the springs 23, 24. An opening of the working pipes L, R in this case is only possible, when the steering unit 2 generates a so high pressure at the load-sensing connection LS that it exceeds the pressure at the control inlet C.

FIG. 11 shows a steering 1 that substantially corresponds to that in FIG. 7. A steering valve 28 has been added that is located in parallel to the steering unit 2 between the pressure connection P and the tank connection T on the one side and the steering motor 8 on the other side. Here, the steering valve 28 ends in the two working pipes L, R between the valve arrangement 10 and the steering motor 8, so that the fluid from the steering valve 28 is not influenced by the valve arrangement 10.

Here, the shock valve arrangement 50 is arranged in parallel to both the steering motor 8 and the steering valve 28. The only condition is that the shock valve arrangement 50 is not influenced by the feedback suppression device 9, that is, it can still ensure that an underpressure or an overload from excess pressure will not cause cavitation damages in the steering motor 8.

When the pressure at the load-sensing connection LS is used for a direct activation of the valve arrangement 10, this may cause a so-called "hard point" in the steering. At the moment of activation of the valve arrangement 10 a small amount of hydraulic fluid is "missing", which can be felt at the steering handwheel 6. To remedy this problem, the embodiment according to FIG. 12, which otherwise corresponds to the embodiment according to FIG. 8 that has a valve arrangement according to FIG. 10, is provided with an auxiliary valve 29. The auxiliary valve 29 is activated by the pressure at the load-sensing connection LS and then creates a connection between the pressure connection P and the hydraulic servo line 13, so that the slides 21, 22 are acted upon by pressure from the pressure connection P against the pressure at the control connection C. The auxiliary valve 29 is changed over by an auxiliary valve spring 30, so that the hydraulic servo line is connected to the tank 5 again.

This embodiment has two substantial advantages. Firstly, the amount of hydraulic fluid required for changing over the auxiliary valve 29 is substantially smaller than the amount of hydraulic fluid required for changing over the two slides 21, 22. Accordingly there is not "hard point" in the steering.

Secondly, with this embodiment it is no longer required that the load-sensing connection LS is at the same pressure as the tank 5 in the neutral position of the steering unit 2. As long as the pressure at the load-sensing connection LS does not exceed the force of the spring 30, the auxiliary valve 29 remains in the position, in which the hydraulic servo line 13 is isolated from the pressure connection P, so that the positions of the slides 21, 22 controlled by the operation mode valve 15 remain unchanged.

FIG. 13 shows a further amendment of a steering 1, in which the valve arrangement 10 corresponds to that of FIG. 12.

The amendment concerns the design of the steering unit. It has a working pressure connection S, from which an "S-pressure" or an "S-signal" can be obtained, which will be described by means of FIG. 14.

In the neutral position (FIG. 14a) the S-signal corresponds to the pressure at the low-pressure connection T. This connection also remains in a small band around the neutral position. In this case, the pressure at the load-sensing connection LS corresponds to the pressure at the tank connection T.

When the steering unit 2 is activated so that the left working pipe L is exposed to pressure (FIG. 14b), the S-pressure or the S-signal corresponds to the pressure in the left working pipe L.

When the right working pipe R is exposed to pressure, the S-signal corresponds to the pressure in the right working line R (FIG. 14c).

Also with this working pressure connection S a hard point in the steering is avoided, as no pressure from the load-sensing connection LS is used to activate the valve arrangement 10. Further, it provides a well-defined non-feedback operation, as in the neutral position the S-signal is effectively set at the pressure of the tank connection T.

Further, a steering arrangement with the working pressure connection S offers an advantage in an emergency steering situation, where the pressure built up at the working pressure connections gives an additional security for the opening of the valves in the working pipes L, R, at least in one of the working pipes L, R.

In all embodiments the steering unit 2 in it has feedback behaviour, that is, a pressure change at its outlets, which are connected to the working pipes L, R, causes that the steering member 6 moved in dependence of the in- or outflowing amount of hydraulic fluid. In many cases, this feedback behaviour is desired, but in many cases it is also undesired. In order to turn on or off this feedback behaviour without changing the steering unit 2, the feedback suppression device 9 can be operated in a purely hydraulic manner.

Figure 15:
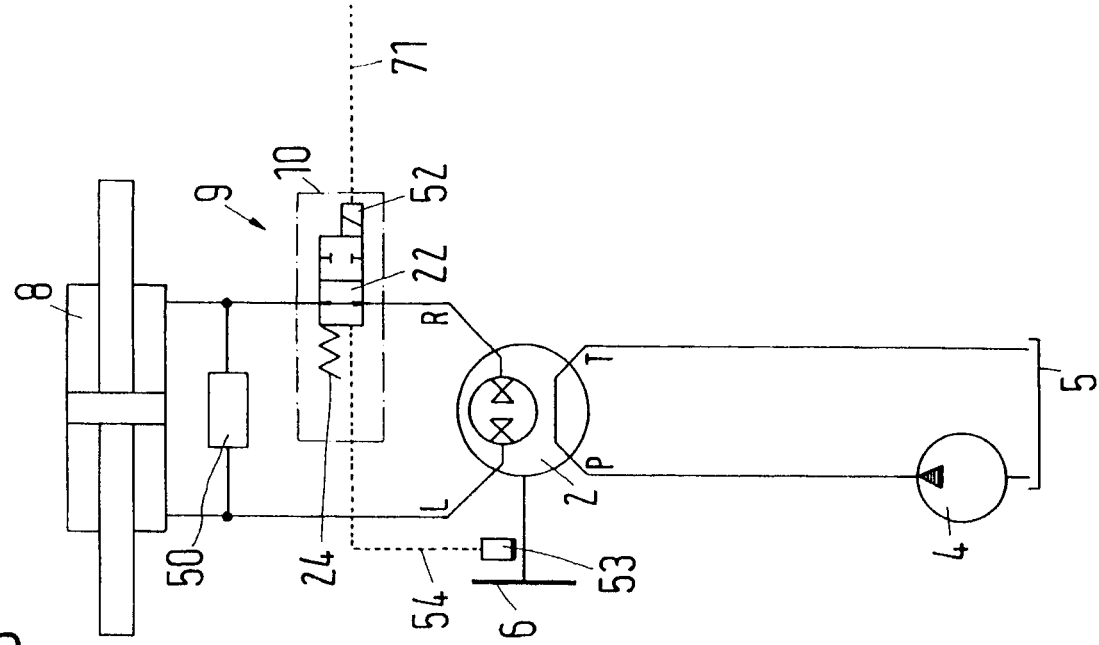
FIG. 15 is a eight embodiment of a steering.

FIG. 15 shows an embodiment of a steering, in which the valve arrangement 10 of the feedback suppression device 9 is electrically operated. For this purpose a signal line 71 is provided, which activates a drive magnet 52 or an-other activation device. When an electrical signal is available, the slide 22 is moved to the closing position not shown against the force of the spring 24, and then interrupts the working pipe R between the steering motor 8 and the steering unit 2.

A steering member sensor 53 is allocated to the steering member 6. As soon as the steering member 6, for example the steering handwheel, is activated, the steering member sensor 53 sends a signal to the magnet 52 or another activation device via a signal line 54, the magnet 52 controlling the slide 22 to the shown passage position, as long as the steering member 6 is activated.

Figure 16:
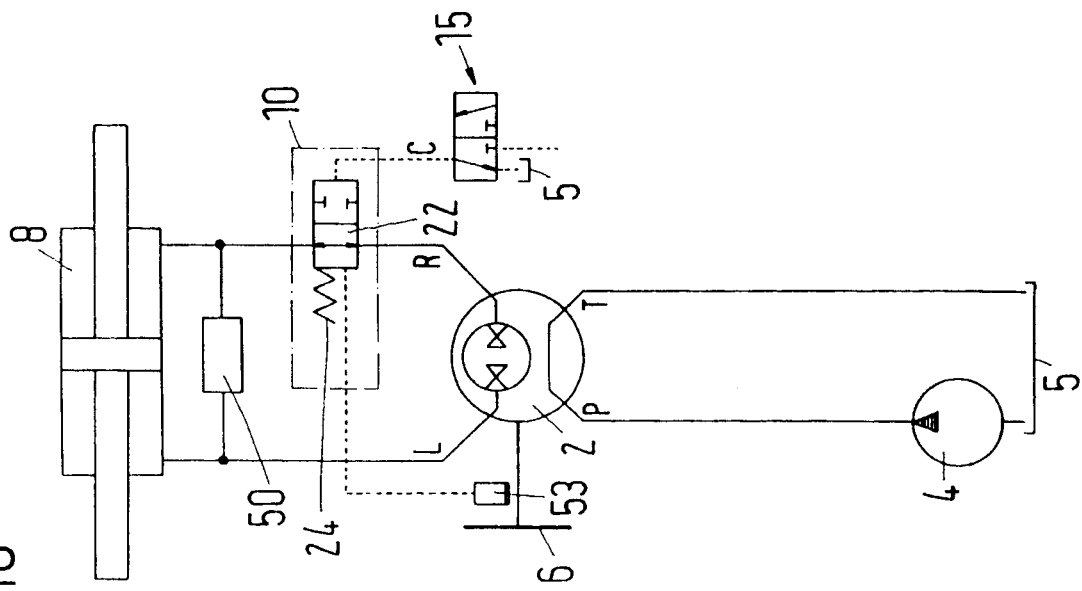
FIG. 16 is a ninth embodiment of a steering.

FIG. 16 shows a modified embodiment. Here the valve arrangement 10 is displaceable to the feedback suppression position of the slide 22, not shown in detail, by means of the operation mode valve 15. By means of the steering member sensor 23 the slide 22 can then be displaced to the shown passage position, as long as a steering movement of the steering member 6 occurs. Also here the activation of the slide is electrically controlled.

When the operation mode valve 15 is in the shown position and the control inlet C is relieved to the tank 5, the slide 22 is displaced to the shown position by the force of the spring 24, in which position a feedback of the steering motor 8 on the steering unit 2 occurs.

Also with the embodiments in FIGS. 15 and 16 it is in principle possible to allocate a valve to each working pipe L, R to give the feedback suppression device a symmetrical design.

Figure 17:
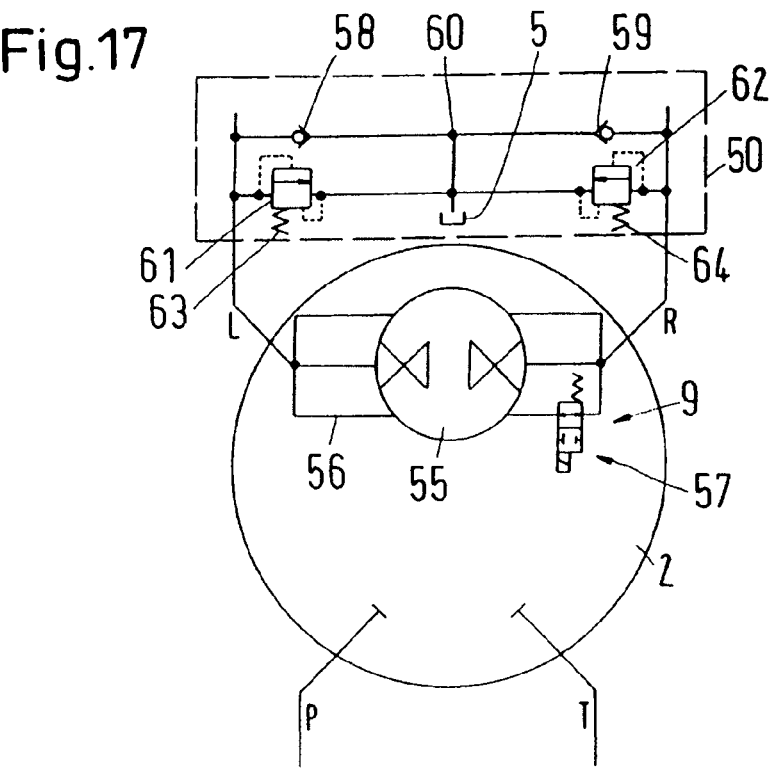
FIG. 17 is a view of a steering unit with shock valve arrangement and feedback suppression device.

FIG. 17 shows a steering unit 2 with integrated feedback suppression device 9.

The steering unit 2 has a merely schematically shown set of teeth 55, which is, for example, formed by an externally toothed gear wheel and an internally toothed gear ring, the gear ring having one more tooth than the gear wheel. Accordingly, pressure pockets appear in a number, which corresponds to the number of teeth of the gear wheel. The use of a gear wheel with six teeth will thus provide six pressure pockets. Each pressure pocket is connected to a valve arrangement, not shown in detail, through a pipe 56, the valve arrangement usually being formed by two slides, which can be turned both in relation to each other and in relation to a housing.

When now one single stop valve 57 is integrated in the steering unit 2, it is sufficient to locate this stop valve 57 in a pipe 56. When a pipe 56 is interrupted, hydraulic fluid can neither leave a pressure chamber nor flow into a pressure chamber. As long as changes of the enclosed volume of a pressure chamber cannot occur, the set of teeth 55 is blocked. Any fluid supplied to the steering unit 2 from the outside will then not cause a corresponding effect in the steering unit.

It is, however, advantageous, to use at least two stop valves 57, which are located so that a stop valve 57 can always block the outlet of a pressure pocket. With six pipes 56, the stop valves 57 would, for example, be located in the pipes No. 1 and No. 4.

The shock valve arrangement 50 has two non-return valves 58, 59 opening in the direction of the working pipes L, R and having a connecting point 60 that is connected to the tank 5. Via the non-return valves 58, 59 hydraulic fluid can be replenished from the tank 5, when external forces act upon the steering motor 8, so that a cavitation in the working chambers of the steering motor 8 is avoided.

The working pipe L is connected to the tank 5 via an overpressure valve 61. The working pipe R is connected to the tank 5 via an overpressure valve 62, so that not only a cavitation but also an overpressure load can be avoided, when external forces act upon the steering motor 8.

The two overpressure valves 61, 62 are biased in the closing direction by springs 63, 64, the springs 63, 64 determining the pressure, at which the overpressure valves 61, 62 open. This pressure of course has to be larger than the pressure, which is usually supplied by the steering unit 2.

Figure 18:
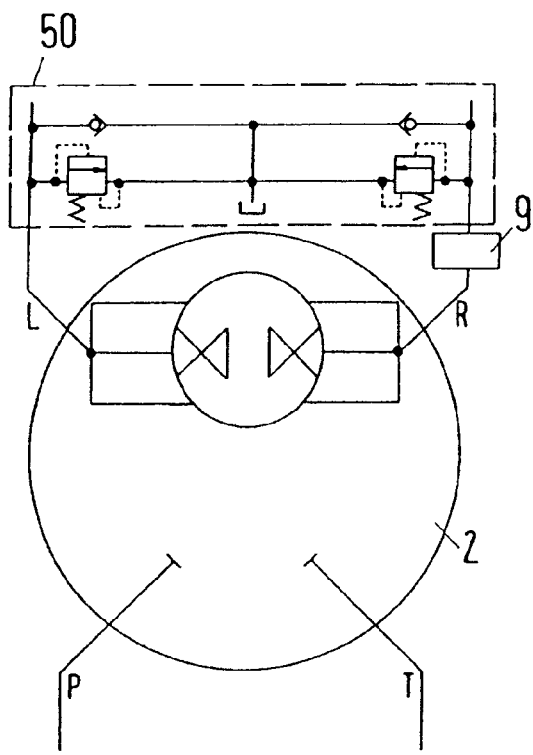
FIG. 18 is a schematic view of a modification of the embodiment according to FIG. 17.
Figure 19:
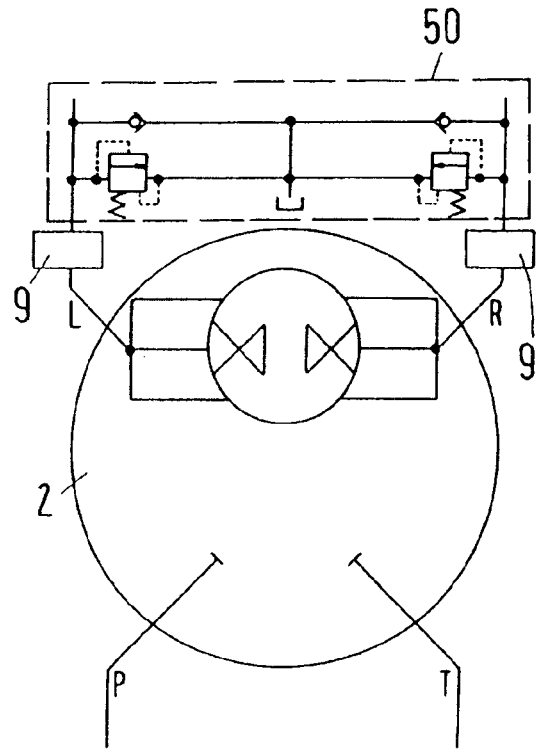
FIG. 19 is a schematic view of a modified embodiment of the steering unit according to FIG. 18.

FIGS. 18 and 19 are further schematic views of the mutual location of the shock valve arrangement 50, the feedback suppression device 9 and the steering unit 2. In the embodiment according to FIG. 18 the feedback suppression device 9 is only located in one working pipe R between the steering unit 2 and the shock valve arrangement 50.

In the embodiment according to FIG. 19 the feedback suppression device 9 is located in both working pipes L, R between the steering unit 2 and the shock valve arrangement 50.

Figure 20:
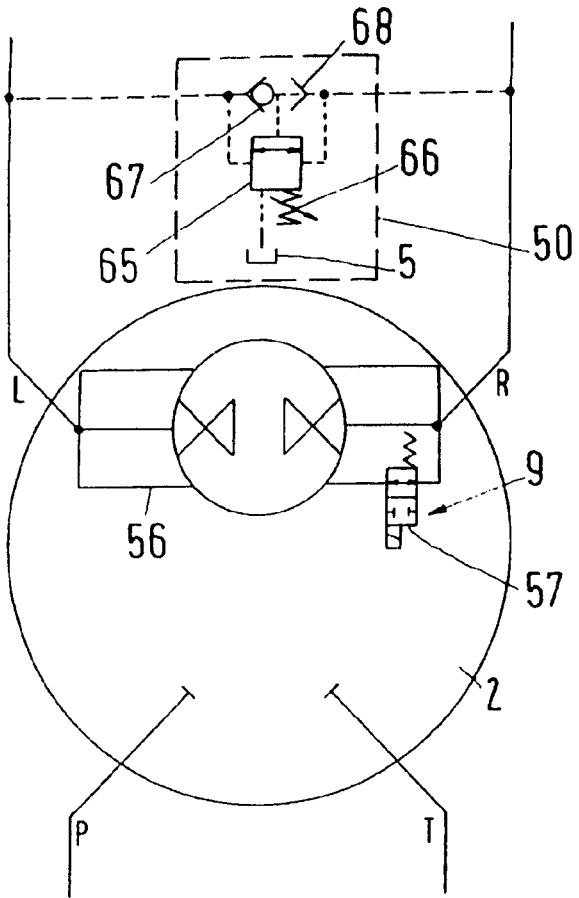
FIG. 20 is a steering unit according to FIG. 17 with an alternative embodiment of a shock valve arrangement.

FIG. 20 shows the steering unit 2 from FIG. 17 with a modified embodiment of a shock valve arrangement 50.

The shock valve arrangement 50 has an interrupt valve 65, which is preloaded in the interruption position by a spring 66. The closing force generated by the spring 66 is adjustable as indicated by the arrow. The interrupt valve 65 is located in parallel to the steering motor 8 between the two working pipes L, R.

In the opposite direction the interrupt valve 65 is loaded by a pressure at the outlet 67 of a change-over valve 68, the change-over valve 68 also being located between the two working pipes L, R.

The spring 66 is dimensioned so that it can retain the interrupt valve 65 in the closed position against a pressure, which can be generated by the steering unit 2.

When external forces act upon the steering motor 8 and the valve 57 is closed, a high pressure may occur in, for example, the working pipe R and a low pressure in the working pipe L. The change-over valve 68 is then displaced to the switching position shown, so that the pressure from the working pipe R acts upon the interrupt valve 65 and opens it against the force of the spring 66. In this case, hydraulic fluid can flow from the working pipe R to the working pipe L via the interrupt valve 65, so that pressure equalization is achieved.

As soon as the pressure in the working pipe R has dropped below a value, which corresponds to the force of the spring 66, the interrupt valve 65 closes.

Thus, hydraulic fluid no longer has to be replenished from the tank 5 or flow off to the tank 5. On the contrary, the pressure equalization takes place directly between the two working pipes L, R.

Figure 21:
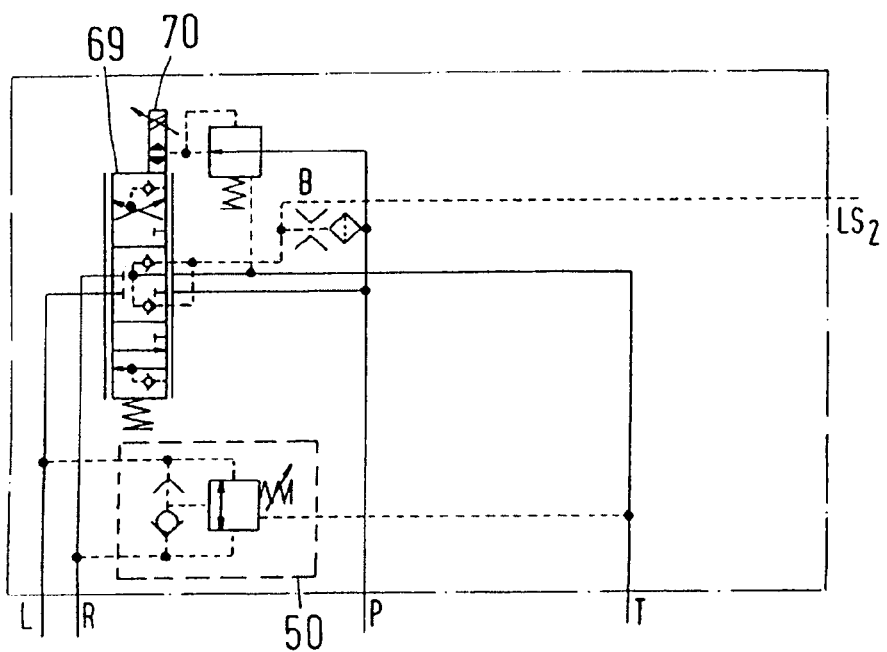
FIG. 21 is a schematic view of a different steering arrangement.

The shock valve arrangement 50 according to FIG. 20 can also be used with a different steering unit, which is shown schematically in FIG. 21.

Here, the steering unit has a proportional valve 69 that can be displaced via a solenoid valve arrangement 70. Such a steering valve is, for example, described in connection with FIG. 11.

A steering unit can also be made so that it comprises all or at least many of the valves shown, so that no or only a few pipes (additionally to the working pipes) to the outside are required.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering with a steering motor, a steering unit with feedback behaviour, a steering member activating the steering unit and a shock valve arrangement between the steering motor and the steering unit, wherein a switchable feedback suppression device is located at the side of the shock valve arrangement facing away from the steering motor.

2. The steering according to claim 1, wherein the steering unit has a housing in which the feedback suppression device is located.

3. The steering according to claim 2, wherein the shock valve arrangement is located in the housing.

4. The steering according to claim 1, wherein the steering unit has a measuring motor with a set of teeth forming several pressure chambers, each being connected to a valve arrangement via a pipe, the feedback suppression device having a stop valve in at least one pipe.

5. The steering according to claim 1, wherein the shock valve arrangement and the feedback suppression device are located in a common valve housing.

6. The steering according to claim 5, wherein the valve housing is arranged at the steering motor.

7. The steering according to claim 1, wherein the steering unit is connected to the steering motor via two working pipes, and the shock valve arrangement has an interrupt valve connecting the two working pipes and being biased in the closed position, the valve being acted upon in the opening direction by the higher of the pressures in the working pipes and connecting the two working pipes with each other in the open state.

8. The steering according to claim 1, wherein the feedback suppression device acts upon both working pipes.

9. The steering according to claim 1, wherein the feedback suppression device has a valve arrangement with electrical control inlet.

10. The steering according to claim 1, wherein the feedback suppression device has a valve arrangement with hydraulic control inlet.

11. The steering according to claim 1, wherein the shock valve arrangement can also be opened by the pressure from the steering unit.

12. The steering according to claim 10 wherein the control inlet is connected to an operation mode valve that supplies the control inlet with a higher or a lower control pressure in dependence of its activation.

13. The steering according to claim 9, wherein the valve arrangement has a biasing device, which acts against the pressure at the control inlet.

14. The steering according to claim 10, wherein a series connection of two change-over valves is located between two working pipes a connecting point of the two change-over valves being connected to the control inlet, each change-over valve having an outlet that is connected to the valve in the working pipe not connected to the change-over valve.

15. The steering according to claim 1, wherein a power assisted steering valve is arranged in parallel with the steering unit, the steering valve being connected to the working pipes in an area between the feedback suppression device and the steering motor.

16. The steering according to claim 12, wherein the operation mode valve is arranged in series with a pressure control valve.

17. The steering according to claim 10, wherein the steering unit has a load-sensing connection, whose pressure acts upon the valve arrangement against the pressure at the control inlet.

18. The steering according to claim 17, wherein the load-sensing connection is connected to an auxiliary valve that is located between a hydraulic servo line and a connection with higher pressure.

19. The steering according to claim 10, wherein the steering unit has a working pressure connection relieved in the neutral position of the steering unit to a low-pressure connection and, at a predetermined deflection of the steering unit, carrying the pressure ruling in the deflected working pipe, a pressure at the working pressure connection acting upon the valve arrangement against the pressure at the control inlet.

20. The steering according to claim 10, wherein the steering unit is an "open-center" steering unit having a pressure connection that is connected to a counter-control connection, whose pressure acts upon the valve arrangement against the pressure at the control inlet.

* * * * *

UNITED STATES PATENT AND TRADEMARK OFFICE
CERTIFICATE OF CORRECTION

| | | |
|---|---|---|
| PATENT NO. | : 9,038,762 B2 | Page 1 of 1 |
| APPLICATION NO. | : 11/714364 | |
| DATED | : May 26, 2015 | |
| INVENTOR(S) | : Jan Vernersen, Ove Pedersen and Niels Bjarne Hansen | |

It is certified that error appears in the above-identified patent and that said Letters Patent is hereby corrected as shown below:

On the title page, item (73) Assignee

Sauer Danfoss Aps,        Nordborg (DK)

To read

Danfoss Power Solutions Aps,    Nordborg (DK)

Signed and Sealed this
Twelfth Day of April, 2016

Michelle K. Lee
*Director of the United States Patent and Trademark Office*